United States Patent [19]
Morisaki et al.

[11] 3,944,687
[45] Mar. 16, 1976

[54] METHOD OF PREPARING PURIFYING AGENTS CONSISTING OF ACTIVATED SILICEOUS POROUS MINERAL SUBSTANCES

[75] Inventors: Kazuo Morisaki; Mikio Watanabe, both of Fukui, Japan

[73] Assignees: Sakai Sen-i Kogyo Kabushiki Kaisha; Hokuriku Kakoki Kabushiki Kaisha, both of Fukui, Japan

[22] Filed: July 2, 1973

[21] Appl. No.: 375,699

[30] Foreign Application Priority Data
Apr. 17, 1973  Japan.............................. 48-42716

[52] U.S. Cl. ................. 427/372; 252/450; 427/399
[51] Int. Cl.² ...................... B05D 3/02; B05D 5/00
[58] Field of Search....... 117/118, 54, 123 R, 123 A, 117/123 B, 169 R, 119.6; 252/450; 427/372, 399

[56] References Cited
UNITED STATES PATENTS

| | | |
|---|---|---|
| 1,133,446 | 3/1915 | Richter ........................... 252/450 X |
| 1,980,569 | 11/1934 | Belden et al. ....................... 252/450 |
| 2,207,145 | 7/1940 | Doht...:............................... 252/450 |
| 2,701,240 | 2/1955 | Bregar ............................... 252/450 |
| 2,892,800 | 6/1959 | Taipale ............................. 252/450 |
| 3,202,518 | 8/1965 | Whittemore ....................... 252/450 |
| 3,769,065 | 10/1973 | Dunn .............................. 117/123 A |
| 3,787,330 | 1/1974 | Sugahara et al. ................... 252/450 |

*Primary Examiner*—William D. Martin
*Assistant Examiner*—Sadie L. Childs
*Attorney, Agent, or Firm*—Steinberg & Blake

[57] ABSTRACT

A purifying agent consisting of an activated siliceous porous mineral substance and used for processing industrial waste water is prepared by impregnating a siliceous porous mineral substance containing a water insoluble metal oxide such as diatomaceous earth and foamed perlite with hydrochloric acid, sulfuric acid or a mixture thereof, and then baking the impregnated mineral substance at a temperature of from 100°C to 500°C thereby converting at least a portion of the water insoluble metal oxide into a water soluble metal salt.

5 Claims, 2 Drawing Figures

METHOD OF PREPARING PURIFYING AGENTS CONSISTING OF ACTIVATED SILICEOUS POROUS MINERAL SUBSTANCES

BACKGROUND OF THE INVENTION

This invention relates to a method of preparing a purifying agent for efficiently purifying pulp waste water, waste water from dyeing factories and other industrial waste waters by activating highly siliceous porous mineral substances such as diatomaceous earth or foamed perlite by baking it at a temperature of from 100° to 500°C, preferably from 250° to 350°C, thereby imparting to the substances the properties of coagulation and decolorization in addition to their inherent properties of dehydration and filtering.

Similar to waste gas, industrial waste water is a source of serious public hazard and conventional methods of processing industrial waste water include chemical biological methods and a method of utilizing active carbon. However, all of these prior art methods are not sufficiently efficient, especially they can not effectively decolorize.

Heretobefore, use of diatomaceous earth and foamed perlite has been limited to auxiliary filtering material or filler for processing industrial waste water and the method of processing diatomaceous earth and foamed perlite has been limited to the pickling treatment for removing clay, organic substances and soluble salts which are contained in these materials and to the baking treatment for the purpose of imparting thereto suitable strength and hardness which are necessary for the filtering material or the baking treatment at high temperatures for foaming.

SUMMARY OF THE INVENTION

An object of this invention is to provide an improved method of preparing a purifying agent having sufficient mechanical strength, hardness and adsorbing, coagulating and decolorizing properties so that fine particles contained in the water to be purified are readily coagulated into flocks which are easy to separate.

Another object of this invention is to provide an inexpensive active purifying agent which can be readily regenerated.

According to this invention these and further objects can be accomplished by providing a method of preparing an activated siliceous porous mineral purifying agent comprising the steps of impregnating a siliceous porous mineral substance containing a water insoluble metal oxide with hydrochloric acid, sulfuric acid or a mixture thereof and then baking the impregnated mineral substance at a temperature of from 100°C to 500°C thereby converting at least a portion of the water insoluble metal oxide into a water soluble metal salt.

The siliceous porous mineral substance utilized in this invention includes diatomaceous earth and foamed perlite which contain $Al_2O_3$ and $Fe_2O_3$.

BRIEF DESCRIPTION OF THE DRAWING

The invention can be more fully understood from the following detailed description taken in conjunction with the accompanying drawing in which.

DESCRIPTION OF THE PREFERRED EMBODIMENTS

According to this invention diatomaceous earth or foamed perlite is impregnated with sulfuric acid or hydrochloric acid and is then baked to convert into a water soluble sulfate or chloride the water insoluble oxides of metals such as $Al_2O_3$ and $Fe_2O_3$ which are contained in the diatomaceous earth or foamed perlite to impart it coagulating and dicolorizing capabilities.

The first step of said activating treatment comprises impregnation of the diatomaceous earth or foamed perlite with a mineral acid such as sulfuric acid or hydrochloric acid or a mixture thereof. The quantity of the acid used is determined by the quantity of metals such as aluminum and iron which are to be converted into water soluble compounds. Since the quantity of such water soluble compounds of aluminum and iron is determined in accordance with the degree of purification desired, this quantity determines the quantity of the acid to be incorporated. However, at this stage, as it is necessary to uniformly impregnate the diatomaceous earth or foamed perlite with the acid it is necessary to soak the diatomaceous earth or foamed perlite in the acid suitably diluted with water of a sufficient quantity of water not to cause waste of time and fuel in the next succeeding baking step. Further, it is not necessary to convert all of the metal oxides into water soluble compounds by a single baking step but where a suitable quantity of the acid is selected the baking step may be performed several times. For this reason, it is rather advantageous that the diatomaceous earth or the foamed perlite utilized in this invention contains a substantial quantity of metal oxides such as $Al_2O_3$ and $Fe_2O_3$.

Figure 1:
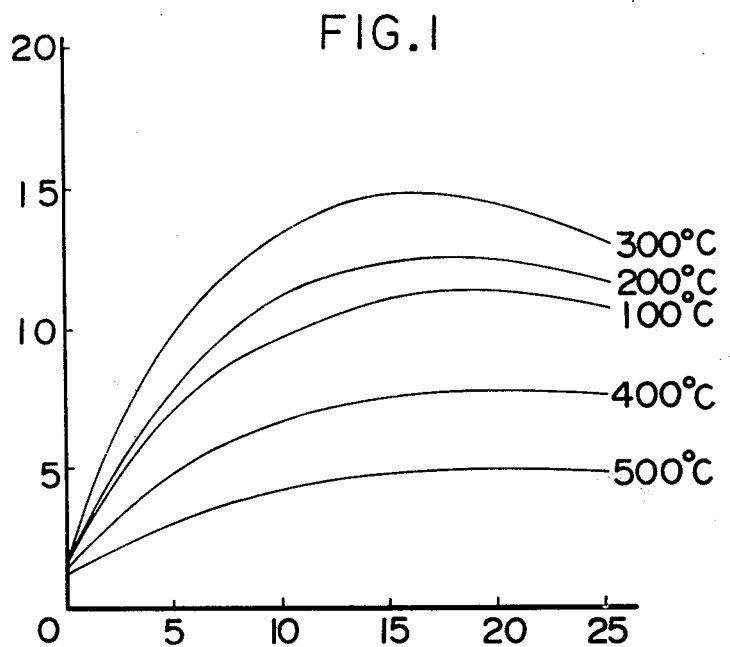
FIG. 1 is a graph showing the relationship between the quantity of iron in diatomaceous earth converted into a water soluble compound, and the quantity of sulfuric acid incorporated at various baking temperatures.
Figure 2:
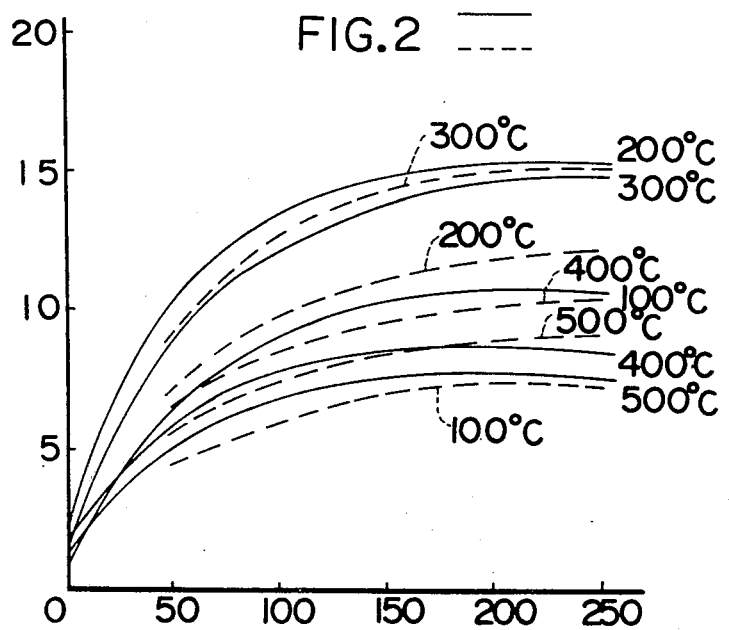
FIG. 2 is a similar graph showing the relationship between the quantity of aluminum contained in diatomaceous earth and foamed perlite respectively, converted into a water soluble compound and the quantity of sulfuric acid incorporated at various baking temperatures.

The second step of this invention involves baking of the diatomaceous earth or foamed perlite which has been impregnated with the acid. The baking temperature must be a temperature at which the metal oxides in the raw material are converted into water soluble salts of inorganic acids, such as sulfates or chlorides, and the resulting salts of the inorganic acid will not be reconverted into water insoluble oxides that is a temperature below the decomposition temperatures of said salts. As shown in FIGS. 1 and 2, as a result of numerous experiments we have found that the range of the suitable baking temperature lies between 100°C and 500°C, preferably between 250°C and 350°C. In these figures, the ordinate shows the concentrations of water soluble aluminum and water soluble iron which were obtained by extracting with 1 liter of distilled water 1 g. of the diatomaceous and foamed perlite after acid treatment and baking and the abscissa shows the quantity of 95% sulfuric acid incorporated to 1 kg of the raw material. Baking time was 10 minutes for respective baking temperatures. As the content of iron in perlite is small (see Table 2 below), it is not shown in FIG. 1. Thus the function of the activated perlite is caused mainly by the water soluble aluminum compound.

The method of activating the diatomaceous earth and the foamed perlite will now be described in detail with reference to some preferred examples.

The diatomaceous earth and the foamed perlite having compositions shown in Table 1 below were pulverized into coarse particles. 1 kg of the powders of the respective raw materials having a particle size smaller than 10 mesh was sampled and dilute sulfuric acid solution obtained by diluting 150 cc of 95% sulfuric acid with about 1 liter of water was added to respective powders and thoroughly mixed therewith for uniformly wetting the powders. 1 g. of a sample of each mixture was baked in an electric furnace at a temperature of about 300°C for 10 minutes. Each 1 g. of the baked diatomaceous earth and baked foamed perlite was extracted with 1 liter of distilled water and the quantities of aluminum and iron dissolved in the water are shown in the following Table 2.

Table 1

| Composition | Weight % | | | | | | | Place of production |
|---|---|---|---|---|---|---|---|---|
| | $SiO_2$ | $Al_2O_3$ | $Fe_2O_3$ | CaO | $K_2O$ | $Na_2O$ | Others | |
| diatomaceous earth | 71.8 | 12.8 | 4.0 | — | — | — | 11.4 | Hokuriku |
| foamed perlite | 75.3 | 15.3 | 1.1 | 0.15 | 3.9 | 3.4 | 0.85 | Kyushu |

Table 2

| Water soluble component concentration (ppm) | Al | Fe | Si |
|---|---|---|---|
| Raw diatomaceous earth | 0.86 | 0.89 | 0.067 |
| Activated diatomaceous earth | 19.7 | 13.4 | 0 |
| Activated foamed perlite | 20.3 | 3.1 | 0 |

The solids obtained by filtration and separation were subjected to similar acid treatment, baking and extraction and the resulting quantities of water soluble aluminum compounds and iron compounds are shown in the following Table 3.

Table 3

| Water soluble composition (ppm) | Al | Fe |
|---|---|---|
| Retreated and reactivated diatomaceous earth | 12.0 | 9.5 |
| Retreated and reactivated foamed perlite | 13.5 | 1.5 |

The advantages of using the activated diatomaceous earth and activated foamed perlite as the purifying agents for purifying industrial waste water will be described in detail in the following.

In the treatment of waste water containing suspended solids which are difficult to precipitate or filters, it is usual to use an organic or inorganic coagulating agent. However, the activated diatomaceous earth and the activated foamed perlite activated as above described contain inorganic coagulating agents in the form of water soluble aluminum and iron salts so that when these activated substances are incorporated into industrial waste water and admixed therewith fine particles suspending in the waste water are adsorbed on the surface of the activated substances due to their inherent adsorbing property. In addition, these adsorbed fine particles are coagulated by the coagulating property imparted to these substances in accordance with this invention. The coagulated particles grow into flocks which separate from the activated substance and precipitate. The precipitated flocks can be separated by filtration. This capability is one of the advantageous feature of the novel purifying agent for use in the purification of industrial waste water.

The condition of activation, the quantity of the water soluble salt formed and the inherent adsorptive property are substantially the same for diatomaceous earth and foamed perlite. Accordingly, the purifying power is also the same. For this reason, it is possible to use the activated diatomaceous earth and the activated foamed perlite under substantially the same condition. Accordingly, the following examples are shown mainly in terms of the activated diatomaceous earth.

EXAMPLE 1

Above described activated diatomaceous earth and activated foamed perlite were used in decolorizing tests for 1 liter of an aqueous solution containing 250 ppm of a dispersed dye (Resoline Blue BR, a trade name of Bayer Co.). The result of the tests are shown in the following Tables 4 and 5. Table 4 shows the result of using the purifying agents shown in Table 2 whereas Table 5 shows the result of using the purifying agents shown in Table 3.

Table 4

| quantity of purifying agent(g/l) | percentage of decolorization (%) | | |
|---|---|---|---|
| | raw diatomaceous earth | activated diatomaceous earth | activated foamed perlite |
| 0.5 | — | 85 | 80 |
| 1.0 | — | 100 | 100 |
| 1.5 | — | — | — |
| 2.0 | — | — | — |
| 5 | 56 | — | — |
| 8 | 85 | — | — |
| 10 | 100 | — | — |

Table 5

| quantity of purifying agent(g/l) | percentage of decolorization (%) | | |
|---|---|---|---|
| | raw diatomaceous earth | activated diatomaceous earth | activated foamed perlite |
| 0.5 | — | 70 | 65 |
| 1.0 | — | 90 | 88 |
| 1.5 | — | 98 | 96 |
| 2.0 | — | 100 | 100 |
| 5 | 56 | — | — |
| 8 | 85 | — | — |
| 10 | 100 | — | — |

The chemical oxygen demand (COD) of the purified water when it was decolorized 100% was about 10.

EXAMPLE 2

The activated diatomaceous earth described above was used in the decolorizing and filtering tests of an aqueous solution containing 250 ppm of a basic dye (Cathion Red 4 GH-Trademark) and the result is shown in the following Table 6.

Table 6

| purifying (decolorizing) agent | quantity used (g/l) | percentage of decolorization | COD (ppm) |
| --- | --- | --- | --- |
| raw diatomaceous earth | 10 | 100 | 10 |
| activated diatomaceous earth | 2 | 100 | 15 |

EXAMPLE 3

The novel purifying agent was used in the test of adsorbing and filtering a surfactant. The liquid treated contained an anion surfactant (alkylbenzenesulphonate) at a concentration of 1,000 ppm and its COD was 192 ppm. After purification, the liquid was filtered with a filter paper. The results of test are shown in the following Table 7.

Table 7

| purifying (adsorbing) agent | quantity used (g/l) | quantity of surfactant in the liquid treated (ppm) | COD (ppm) |
| --- | --- | --- | --- |
| raw diatomaceous earth | 10 | 52 | 12 |
| activated diatomaceous earth | 1 | 42 | 8 |

Tables 6 and 7 show that the activated diatomaceous earth of this invention is also effective to remove ionic substances such as an anionic surfactant as well as a basic dye.

EXAMPLE 4

The activated diatomaceous earth was used in the field test of industrial water containing a dispersed dye, a surfactant, inorganic salts ($Na_2CO_3$, $Na_2SO_4 \cdot 10H_2O$, $Na_2S_2O_4 \cdot 2H_2O$), organic salts ($CH_3COOH$, $CH_3COONa$, etc.) and the quality of the water before and after purification was measured. The result is shown in the following Table 8. The quantity of the activated diatomaceous earth used as the purifying agent was 2 g/liter.

Table 8

| color of the sample | COD (ppm) | | pH | | transparency (cm) | | percentage of decolorization(%) |
| --- | --- | --- | --- | --- | --- | --- | --- |
| | before treatment | after treatment | before treatment | after treatment | before treatment | after treatment | |
| pale brown | 261 | 31.4 | 10 | 7 | 11.5 | more than 30 | 100 |
| dark blue | 158 | 30.9 | 9 | 7 | 10.0 | more than 30 | 100 |

As can be noted from this table when the novel activated diatomaceous earth is used as a purifying agent of industrial waste water, 100% decolorization is possible and the COD is reduced to about 30 ppm which shows that the purification efficiency is extremely high.

EXAMPLE 5

The decolorization capability of regenerated diatomaceous earth obtained by drying and baking a cake like substance obtained by the purification treatment was tested and the result thereof is shown in the following Table 9.

Table 9

| purifying (decolorization) agent | quantity used (g/l) | percentage of decolorization (%) | COD (ppm) |
| --- | --- | --- | --- |
| regenerated diatomaceous earth | 3 | 100 | 20 |

As above described, this invention provides activated diatomaceous earth and activated foamed perlite which are effective purifying agents for processing industrial waste water. With these purifying agents, the waste substances contained in the processed water coagulate on the nuclei comprising the activated diatomaceous earth or the activated foamed perlite which are solid having suitable mechanical strength and hardness so that the coagulated substances rapidly precipitate and can be readily separated. Moreover such coagulated substances do not clog the filter thus facilitating the filtering operation. The activated diatomaceous earth and the activated foamed perlite may be used singly or concurrently with similar advantages.

What is claimed is:

1. Method of preparing activated siliceous porous mineral substances so as to increase the ability thereof to purify waste waters and the like, which consists essentially of impregnating an adsorptive siliceous porous mineral substance containing water insoluble $SiO_2$ and a water insoluble metal oxide and being selected from the group consisting of diatomaceous earth and foamed perlite with at least one mineral acid selected from the group consisting of hydrochloric acid and sulphuric acid in an amount sufficient to convert a predetermined quantity of said insoluble metal oxide to the corresponding water soluble salt, baking the thus impregnated porous mineral substance at a temperature of from 100°C to 500°C for a time sufficient to convert said predetermined quantity of said water insoluble metal oxide into the corresponding water soluble salt which remains within the porous structure of said porous mineral substance and there acts as coagulant for impurities in waste water and the like to increase the purifying action of said adsorptive siliceous porous mineral substance while said $SiO_2$ remains in its water insoluble adsorbent form, and retaining said water soluble metal salt in said porous structure of said activated siliceous porous mineral substance until the same is used for the purification of waste waters and the like.

2. The activated siliceous porous mineral substance produced by the method of claim 1.

3. The method according to claim 1 wherein said water insoluble metal oxide is selected from the group consisting of $Al_2O_3$ and $Fe_2O_3$.

4. The method according to claim 1 wherein said baking is performed at a temperature of from 250°C to 350°C.

5. Method according to claim 1 wherein said porous mineral substance contains both $Al_2O_3$ and $Fe_2O_3$ as metal oxides.

* * * * *